US009615559B2

(12) United States Patent
    Hyun

(10) Patent No.: US 9,615,559 B2
(45) Date of Patent: Apr. 11, 2017

(54) REEL EQUIPPED WITH LINE GUIDE

(71) Applicant: DOYO ENGINEERING CO., LTD., Bucheon (KR)

(72) Inventor: Kwang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 14/943,400

(22) Filed: Nov. 17, 2015

(65) Prior Publication Data
    US 2016/0143259 A1    May 26, 2016

(30) Foreign Application Priority Data

Nov. 20, 2014 (KR) .......................... 10-2014-0162819

(51) Int. Cl.
    *A01K 89/01*    (2006.01)
    *A01K 89/015*   (2006.01)

(52) U.S. Cl.
    CPC .............................. *A01K 89/01912* (2015.05)

(58) Field of Classification Search
    CPC ............ A01K 89/015; A01K 89/01912; A01K 89/019125; A01K 89/01916; A01K 89/01917
    See application file for complete search history.

(56) References Cited

U.S. PATENT DOCUMENTS

| | | | | | |
|---|---|---|---|---|---|
| 4,666,101 | A | * | 5/1987 | Atobe | A01K 89/015 242/261 |
| 4,974,792 | A | * | 12/1990 | Miyazaki | A01K 89/015 242/279 |
| 5,139,213 | A | * | 8/1992 | Furomoto | A01K 89/015 242/279 |
| 5,257,753 | A | * | 11/1993 | Sato | A01K 89/015 242/310 |
| 5,328,138 | A | * | 7/1994 | Sakaguchi | A01K 89/015 242/261 |
| 5,482,220 | A | * | 1/1996 | Hashimoto | A01K 89/015 242/279 |
| 6,095,444 | A | * | 8/2000 | Miyazaki | A01K 89/015 242/310 |
| 6,464,158 | B1 | * | 10/2002 | Sakurai | A01K 89/006 242/283 |
| 2004/0144877 | A1 | * | 7/2004 | Kawasaki | A01K 89/015 242/278 |
| 2007/0181728 | A1 | * | 8/2007 | Kawasaki | A01K 89/00 242/310 |
| 2012/0104135 | A1 | * | 5/2012 | Toma | A01K 89/015 242/227 |

* cited by examiner

*Primary Examiner* — Emmanuel M Marcelo
(74) *Attorney, Agent, or Firm* — Cantor Colburn LLP

(57) ABSTRACT

A reel equipped with a line guide. The reel includes: a reel body having a spool; a level winder including a double threaded-shaft mounted ahead of the spool on the reel body; and a line guide having a body having a corresponding fastening portion coupled to the double threaded-shaft of the level winder and having a guide portion that is formed at an upper portion of the body and through which a fishing line passes, in which a line contact-reinforcing member made of a wear resistance material is disposed in the line guide.

3 Claims, 5 Drawing Sheets

REEL EQUIPPED WITH LINE GUIDE

BACKGROUND OF THE INVENTION

Field of the Invention

The present invention relates to a reel equipped with a line guide having a line contact-reinforcing member. More particularly, the present invention relates to a reel in which a reinforcing member having wear resistance is applied to a line guide having a guide portion that is coupled to a level winder for uniformly winding a fishing line on a spool and guides the fishing line; the line guide is formed in an assembly type to be easily assembled for production and maintenance; the line guide is composed of an outside-narrow first reinforcing contact ring and an inside-wide second reinforcing contact ring for prevention from being damaged even due to contact and hitting while a knot of a lead connected with a hook and a line is released and wound; and a through-drain portion is formed at the guide portion to discharge water or dirt.

Description of the Related Art

In relation to a line guide of a reel, there is Korean Patent Application Publication No. 10-1999-0072506, titled "Line guide for fishing rod", in the related art.

This patent application proposes a line guide for a fishing rod that has a body having a line-through portion and a mounting portion and a guide ring fitted in the an end of the line-through portion in order to solve the problem that when an inclined guide surface for drawing a fishing line of a line guide is decreased in inclination, the entire length and weight of a body is increased, and to connect the front end of an inclined guide surface for drawing a fishing line to the outer side of the front end of a main wall and making the connected portion close to the top from a horizontal central axis of the main wall in a guide line having an inclined guide surface for drawing a fishing line which bends up at the rear portion of the front end of a main wall of a ling-through portion.

Further, there is Korean Patent Application Publication No. 10-2000-0011183, titled "Line guide for fishing rod and telescopic fishing rod", in the related art.

This patent application proposes a line guide for a fishing rod and a stretchable fishing rod in which an attachment portion having a fishing rod hole is made of synthetic resin, four straight fishing rod contact sides are provided by forming the cross-section of the fishing rod hole in a square shape, so when a fishing rod is inserted in the fishing rod hole with the fishing rod sides in contact with the outer side of the fishing rod, the spaces between opposite fishing rod contact sides increase, the fishing rod boy is deformed, and some of resistance against the insertion is removed by the deformation such that pushing force can be easily controlled, and accordingly, the fishing rod can be precisely and easily fixed to a desired position and prevented from breaking.

However, according to these two cases, there is no configuration for reducing friction force between a line guide and a fishing line, so it is impossible to solve the problem that the fishing line is cut by the friction force, and the line guides are easily damaged by a fishing line that has high strength, so a large cost is required for maintenance.

Further, there is Korean Utility Model No. 20-0186638, titled "Line guide structure of bait cast reel for fishing".

This case proposes a line guide structure of a bait cast reel for fishing that has improve durability and external appearance due to metallic luster, by forming sliding holes through the sides of a rectangular body and combining a supporter made of synthetic resin and having a threaded portion at the lower portion with a metallic line guide bending opposite to the supporter, having holes at both sides, having an extension at a side, and having a guide portion at the extension, in a common line guide structure of a bait cast reel for fishing that includes a body, a worm shaft and a stopper at a side of a spool, a stopper fixing bolt, and a guide bar.

In this case, however, durability is improved by a metallic line guide, but there is a problem that when a line guide is made of metal, a fishing line that comes in direct contact with the line guide is cut by friction force, so the fishing line should be replaced.

Further, there is Korean Patent Application Publication No. 10-2000-0062435, titled "A line guide for a fishingrod and fishingrod", in the related art.

This case proposes a line guide for a fishing rod and a fishing rod that make it possible to throw a hook to an accurate position without line entanglement and allow an entangled line to be easily drawn out by increasing the front-rear length of a rear support leg such that the inclination of the rear support leg is gentle, by making the rear support leg of a frame longer than the entire length of a front support leg and a front attachment foot in a middle guide and limiting the length of the front support leg to about ¼ of the outer diameter of a ring fixing portion by cutting the front support leg and the front attachment foot inside left and right support legs.

This case, however, proposes a line guide preventing a line from being easily entangled and improving accuracy, but it is difficult to prevent a fishing line from being damaged by friction or prevent wear of the line guide, even though the structure is simple, so there is a problem of frequent replacement and a high cost for maintenance.

Further, since the line guide is fixed to a level winder by bonding and fitting, the line guide may be pulled out in accordance with the direction of releasing or winding a fishing line due to the bonding method and the fitting direction. Furthermore, in the bonding type using bond, the adhesive force is reduced by water, so the line guide may be pulled out.

In addition, in the fixing type of fitting, a level winder where a line guide is fitted is usually made of plastic, but plastic expands or contracts, depending on the atmospheric temperature, so when it expands, the fitting force is reduced and the line guide may be pulled out, and when it contracts, the line guide may break.

SUMMARY OF THE INVENTION

Accordingly, the present invention has been made keeping in mind the above problems occurring in the related art, and the present invention is intended to propose a reel equipped with a line guide in which a reinforcing member having wear resistance is applied to the line guide that has a guide portion for guiding a fishing line and is combined with a level winder for uniformly winding a fishing line around a spool.

Further, the present invention is intended to propose a reel that has a structure according to features of winding/releasing of a knot of a line and a lead connected to a hook by making a line guide with an outside-narrow first reinforcing contact ring and an inside-wide second reinforcing contact ring, and that can sufficiently prevent damage to the line guide even by repetitive contact and hitting by a fishing line wound and released.

Further, the present invention is intended to propose a reel considering convenient assembly for production and maintenance by making a line guide having an assembly type structure.

Further, the present invention is intended to propose a reel that can contribute to keeping both a fishing line and the reel clean, and has improved durability due to a drain formed under a guide portion to discharge water and dirt.

In order to achieve the above object, according to one aspect of the present invention, there is provided a reel equipped with a line guide that includes: a reel body having a spool; a level winder including a double threaded-shaft mounted ahead of the spool on the reel body; and a line guide having a body having a corresponding fastening portion coupled to the double threaded-shaft of the level winder and having a guide portion that is formed at an upper portion of the body and through which a fishing line passes, in which a line contact-reinforcing member made of a wear resistance material is disposed in the line guide.

The reinforcing member for the line guide may include an outside-narrow first reinforcing contact ring and an inside-wide second reinforcing contact ring that are spaced from each other.

The body may have a mounting portion and the reinforcing member may have an assembly type structure in which a reinforcing contact ring and a coupling portion are integrally formed, and the reel may further include a fixer for fixing the coupling portion of the reinforcing member inserted in the mounting portion of the body.

A drain may be formed under the guide portion of the line guide.

According to a reel equipped with a line guide, a reinforcing member having wear resistance is applied to the line guide having a guide portion for guiding a fishing line and combined with a level winder for uniformly winding a fishing line around a spool, thereby improving strength and durability of the line guide. Further, the line guide is composed of an outside-narrow first reinforcing contact ring and an inside-wide second reinforcing contact ring, so a structure according to features of winding/releasing of a knot of a line and a lead connected to a hook is achieved, and it is possible to sufficiently prevent damage to the line guide even by repetitive contact and hitting by a fishing line wound and released.

Convenient assembly for production and maintenance is considered by making a line guide having an assembly type structure, and a drain is formed under the guide portion to discharge water and dirt, so it is possible to contribute to keeping both a fishing line and the reel clean, and improving durability.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
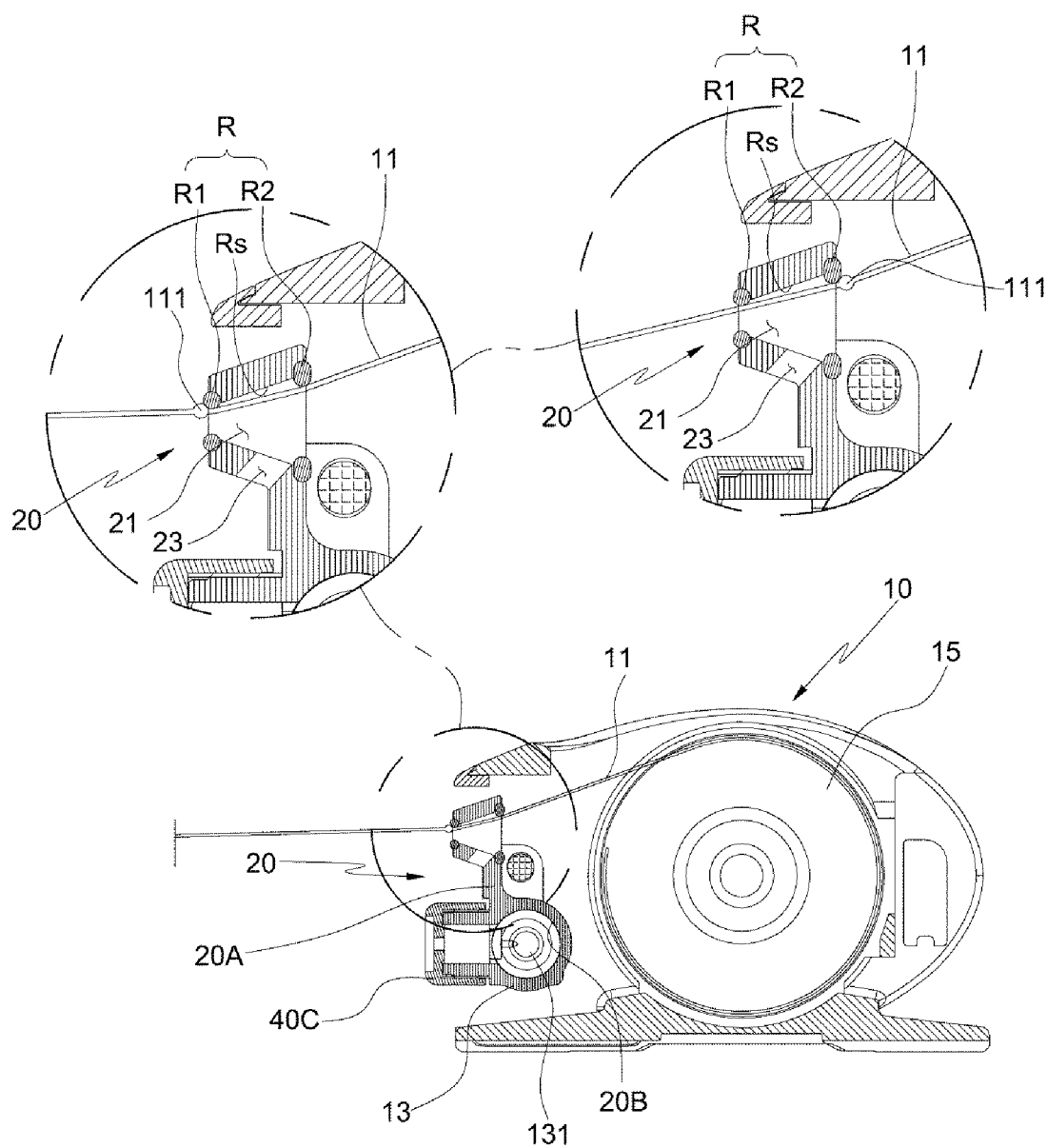
FIG. 1 is a cross-sectional view of a line guide assembly according to a first embodiment of the present invention.

The present invention is described hereafter in detail with reference to the accompanying drawings.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises," "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

First, as shown in FIG. 1, a reel according to the present invention includes a reel boy 10 having a spool 15, a level winder 13 mounted on the reel body ahead of the spool 15, and a line guide 20 mounted on the level winder 13 and having a guide portion 20 through which a fishing line 11 passes.

In detail, the reel body 10 is configured such that as a handle (not shown) coupled to a fishing rod at a side of the reel body 10 is rotated, the fishing line 11 is wound around or released from the spool 15 on the reel body 10, in which the fishing line 11 may be unevenly wound or entangled on the spool 15 due to continuous winding and releasing. Accordingly, the reel body 10 is equipped with the line guide 20 to solve this problem and the line guide 20 is provided to allow the fishing line 11 to be evenly wound around the spool 15 by reciprocating when the spool 15 is rotated.

With the line guide 20, the level winder 13 including a double threaded-shaft 131 on the reel body 10 ahead of the spool 15 is provided.

In detail, the level winder 13 has the double threaded-shaft 131 to allow the line guide 20 to move left/right with respect to the spool 15 and the line guide 20 has a body 20A having a corresponding fastening portion 20B combined with the double threaded-shaft 131 and the guide portion 21 that is formed at the upper portion of the body 20A and through which the fishing line 11 passes.

Accordingly, the fishing line 11 passing through the guide portion 21 is evenly wound around the spool 15 by the double threaded-shaft 131 of the level winder 13 and the corresponding fastening portion 20B of the line guide 20 that reciprocates when the handle is rotated.

The reel of the present invention is characterized in that a line contact-reinforcing member made of a wear resistance material is applied to the line guide 20, particularly the portion that the fishing line 11 comes in contact with.

A first embodiment of the present invention is shown in FIG. 1 in relation to this characteristic.

The line guide 20 has the body 20A where the guide portion 21 through which the fishing line 11 that is wound around the spool 15 is formed.

A reinforcing member can be achieved by coating the inside of the guide portion 21 or fitting a sleeve in the guide portion 21.

In FIG. 1, the guide portion 21 has a cone-shaped narrow-outside and wide-inside structure (the side facing the spool 15 is the inside and the opposite side to which the fishing line is released is the outside) and a reinforcing member R is composed of a first outside reinforcing contact ring R1 and a second inside reinforcing contact ring R2 in consideration of efficiency to cost, in which the reinforcing contact rings may be made of ceramic. In detail, the first reinforcing contact ring R1 is made relatively small and the second reinforcing contact ring R2 is made relatively large to fit to the guide portion 21 having a cone-shaped narrow-outside and wide-inside structure with an inclined portion, that is, inner inclined portion Rs, so the outside-narrow first reinforcing contact ring and the inside-wide second reinforcing contact ring are achieved. The first and second reinforcing contact rings are fixed in the guide portion 21 having the cone-shaped outside-narrow and inside-wide structure by forcible fitting or bonding.

The first outside reinforcing contact ring R1 and the second inside reinforcing contact ring R2 protrude inward further than the inner side of the guide portion 21 having the cone-shaped outside-narrow and inside-wide structure to protect the guide portion from friction or hitting by the fishing line 11.

In detail, the outside-narrow first reinforcing contact ring R1, as shown in the circle shown by a dashed dotted line at the left upper portion in FIG. 1, for example, prevents the guide portion from damage and wear by coming in contact with the fishing line 11 usually while a knot 111 of a line and a lead connected with a hook is wound.

In detail, the inside-wide second reinforcing contact ring R2, as shown in the circle shown by a dashed dotted line at the right upper portion in FIG. 1, for example, prevents the guide portion from damage and wear by coming in contact with the fishing line 11 usually while the knot 111 of the line and the lead connected with the hook is released.

The function of protecting the guide portion by the first and second reinforcing contact rings can be further improved because, as shown in the figure, they are disposed at the outside and inside ends, respectively, and protrude by a predetermined degree further than the outside end the inside end of the guide portion.

As described above, the outside-narrow first reinforcing contact ring R1 and the inside-wide second reinforcing contact ring R2 are spaced from each other by a spacing portion, that is, the guide portion 21 having the cone-shaped outside-narrow and inside-wide structure, and effectively protect the guide portion from wear and hitting particularly by the knot 111 of the lead and the line.

Figure 4:
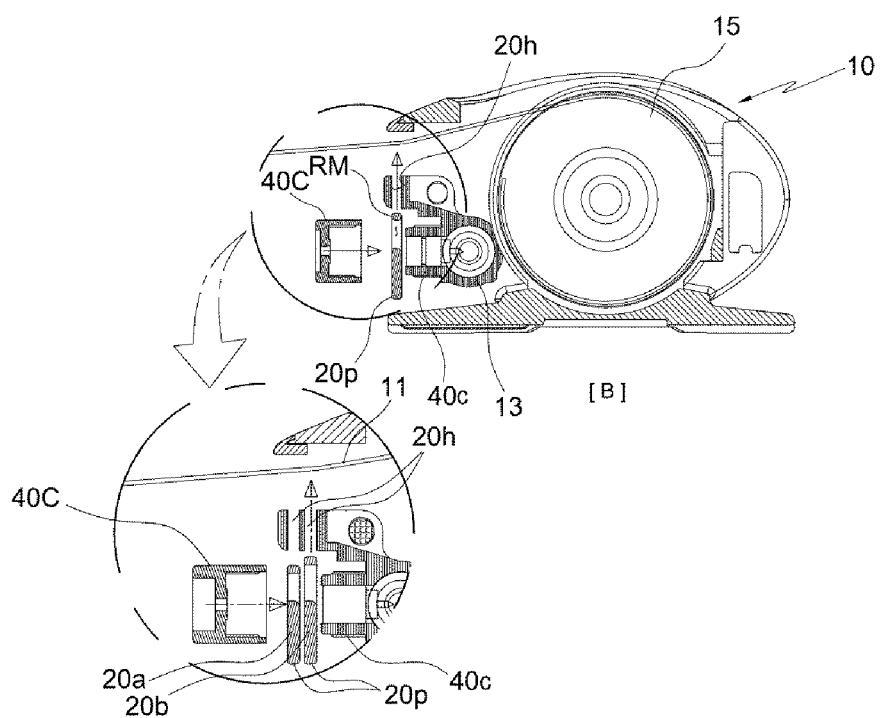

The line guide 20 is fixed by a cap 40C after being combined with the level winder 13, and to this end, as shown in the circle shown by a dashed dotted line at the lower portion in FIG. 4, a male threaded-portion 40c that is thread-fastened to a female thread on the inner side of the cap 40C protrudes at the lower portion of the body 20A.

As shown in FIG. 1, a drain 23 is further formed in the line guide 20, particularly, under the guide portion 21, because, the fishing line 11 is put in water for fishing, and when the fishing line 11 is wound, various types of dirt in the water and water are wound with the fishing line 11, which may not only contaminate the fishing line and the reel, but corrode the reel and other parts.

The drain 23 is formed at the lower portion of the line guide 20 to prevent or reduce this problem, so when the fishing line 11 is wound (even released), water or dirt drops off the fishing line 11 by contact between the fishing line and the guide portion or the reinforcing member or inertia and its own weight while the fishing line is wound and released, in which the water or dirt is guided outside from the line guide 20, that is, the reel through the drain.

The drain 23 is formed at an angle from the inner side of the guide portion 21 to the outside so that water or dirt flowing down on the inclined portion Rs inside the guide portion 21 is moved and discharged through the drain 23 by gravity.

The drain may be modified in various shapes and applied to the reel structures shown in FIGS. 2 to 5.

Figure 2:
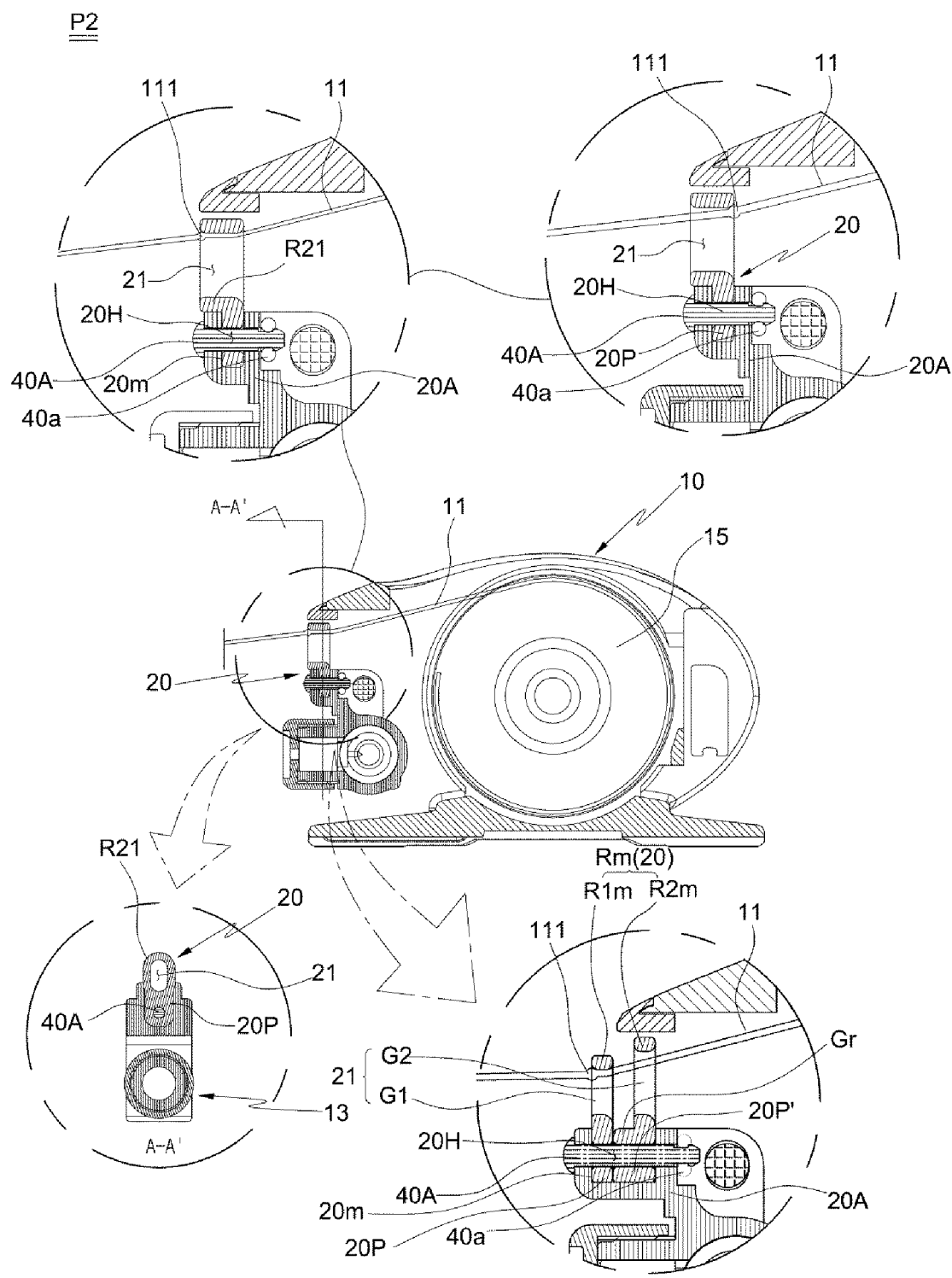
FIG. 2 is a cross-sectional view of a line guide assembly according to a second embodiment of the present invention.

Next, FIG. 2 shows an assembly of a line guide 20 according to a second embodiment of the present invention.

Instead of the structure of the line guide 20 in which the guide portion 21 and the body 20A are integrally formed, as shown in FIG. 1, in FIG. 2, a guide ring R21 forming the guide portion 21 and a body 20A having a corresponding fastening portion 20B coupled to a double threaded-shaft 131 are combined in the line guide 20.

Further, a line contact-reinforcing member for wear resistance of the line guide may be achieved by coating the inner side of guide portion with a wear resistance material or by using a reinforcing sleeve.

When the entire guide ring R21 is made of a wear resistance material such as ceramic, when the inner side of the guide portion 21 is coated, or when a reinforcing sleeve is used, a kind of reinforcing contact ring is implemented.

In particular, the guide ring R21 has an insertion protrusion 20P at the lower portion that is a coupling portion, the insertion protrusion is inserted in a groove-shaped mounting portion 20m formed in the body 20A of the line guide 20, and the insertion protrusion and the mounting portion may be fixed to each other by a fixer, particularly, a pin type fixer 40A and a compressive ring 40a biting a ring-shaped groove at an end of the pin. The pin type fixer and the compressive ring may be replaced by a bolt and a nut, respectively. A hole 20H is formed in the front-rear direction at the mounting portion 20m to insert the pin type fixer 40A.

In the circle shown by a dashed dotted line at the upper left side in FIG. 2, the guide ring R21 and a reinforcing contact ring in contact with the knot 111 when the fishing line 11 is wound are shown in an enlarged size.

In the circle shown by a dashed dotted line at the upper right side in FIG. 2, the guide ring R21 and the reinforcing contact ring in contact with the knot 111 when the fishing line 11 is released are shown in an enlarged size.

For reference, a cross-sectional view cutting a lower insertion protrusion 20P that is a coupling portion of the guide ring R21, that is, taken along line A-A' in the cross-sectional view at the center is shown in the circle shown by a dashed dotted line at the lower left side in FIG. 2.

As a modification, a structure having first and second guide rings R1m and R2m inserted in the groove-shaped mounting portion 20m of the body 20A of the line guide 20 is shown in the circle shown by a dashed dotted line at the lower right side in FIG. 2.

When the guide ring Rm, that is, the first and second guide rings R1m and R2m are entirely made of a wear resistance material such as ceramic, when the inner side of the guide portion is coated with a reinforcing material, or a reinforcing sleeve is used, it may be considered as a kind of reinforcing contact ring.

In particular, in order that the first and second reinforcing contact rings R1m and Rm2 effectively protect the guide portion 21 (that is, a narrow outside first guide portion G1 of the first reinforcing contact ring R1m and a wide inside second guide portion G2 of the second reinforcing contact ring R2m) from wear and hitting by the fishing line 11 (particularly, the knot 111 of the lead and the line) in accordance with the feature of winding/releasing the fishing line and the feature of the structure around the guide portion of the reel, the outside-narrow first reinforcing contact ring R1m and the inside-wide second reinforcing contact ring R2m are spaced from each other by a projection Gr of the second reinforcing contact ring R2m.

The first and second reinforcing contact rings R1m and R2m have insertion protrusions 20P and 20P', respectively, which are coupling portions, the insertion protrusions are inserted in the groove-shaped mounting portion 20m formed in the body 20A of the line guide 20, and the insertion protrusion and the mounting portion are fixed to each other by a fixer, particularly, a pin type fixer 40A and a compressive ring 40a biting a ring-shaped groove at an end of the pin.

Figure 3:
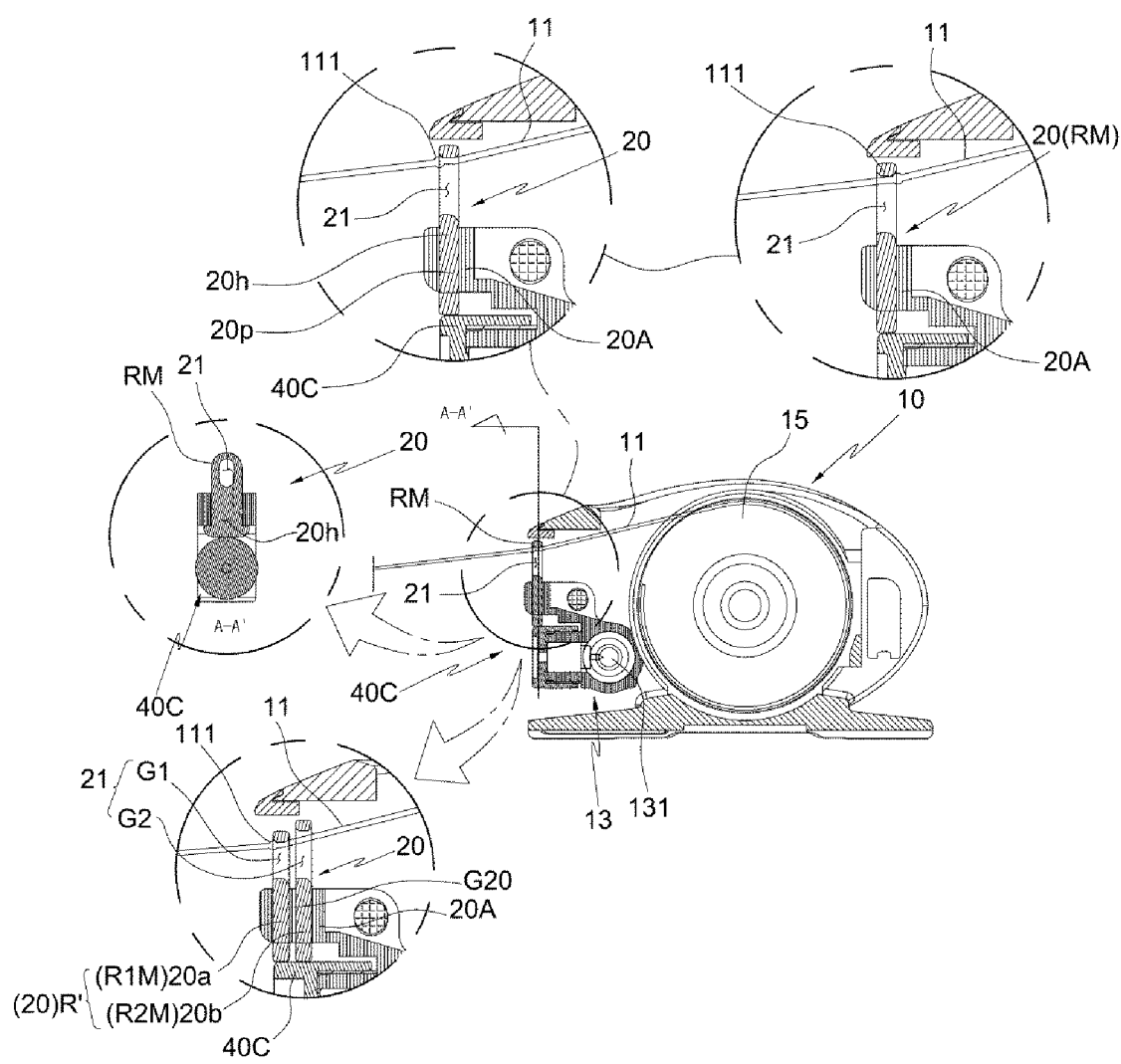
FIGS. 3 and 4 are cross-sectional views of a line guide assembly according to a third embodiment of the present invention.

FIG. 3 shows a reel having a guide ring RM on another assembly type line guide 20 according to a third embodiment, in which a vertical hole 20h as a mounting portion is formed in a separable body 20A.

In the circle shown by a dashed dotted line at the upper left side in FIG. 3, the guide ring RM and a reinforcing contact ring in contact with the knot 111 when the fishing line 11 is wound are shown in an enlarged size.

In the circle shown by a dashed dotted line at the upper right side in FIG. 3, the guide ring RM and the reinforcing contact ring in contact with the knot 111 when the fishing line 11 is released are shown in an enlarged size.

As shown in cross-sectional views of FIGS. 3 and 4 that show an assembled state and an assembly process, when the entire guide ring RM is made of a wear resistance material such as ceramic, when the inner side of the guide portion is coated with a reinforcing material, or when a reinforcing sleeve is used, the guide ring RM having a guide portion that can be considered as a reinforcing contact ring has an insertion protrusion 20p at the lower portion that is a coupling portion.

The guide portion 21 is inserted into the vertical hole 20h that is a mounting portion of the body 20A and then the cap 40C is coupled to the male threaded-portion 40c of the body 20A, so the cap 40 functions as a fixer. That is, the lower end of the insertion protrusion 20p is in contact with the upper portion of the outer side of the cap, thereby preventing the reinforcing contact ring RM from being separated. If necessary, a protrusion or a specific fixing member may be used to the reinforcing contact ring RM from shaking up/down.

For reference, a cross-sectional view cutting a lower insertion protrusion 20p that is a coupling portion of the guide ring RM, that is, taken along line A-A' in the cross-sectional view at the center is shown in the circle shown by a dashed dotted line at the lower left side in FIG. 3.

As can be seen from an assembly cross-sectional view in the circle shown by a dashed dotted line at the lower left side in FIG. 3 and an exploded cross-sectional view in the circle shown by a dashed dotted line at the lower center in FIG. 4, first and second guide rings spaced from each other and first and second reinforcing contact rings R1M and R2M spaced from each other are provided, as another modified embodiment.

A reinforcing contact ring R' of the guide line 20 also has an outside-narrow first guide portion G1 and an inside-wide second guide portion G2, an outside-narrow first reinforcing contact ring R1M and a inside-wide second reinforcing contact ring R2M are spaced from each other when they are combined, by a separation wall G20 between two vertical insertion holes 20h that are mounting portions of a body 20A, where insertion protrusions 20a and 20b of the reinforcing contact rings are positioned, and the insertion protrusions, that is, the two reinforcing contact rings R1M and R2M are prevented from separating by a cap 40C that functions as a fixer.

Figure 5:
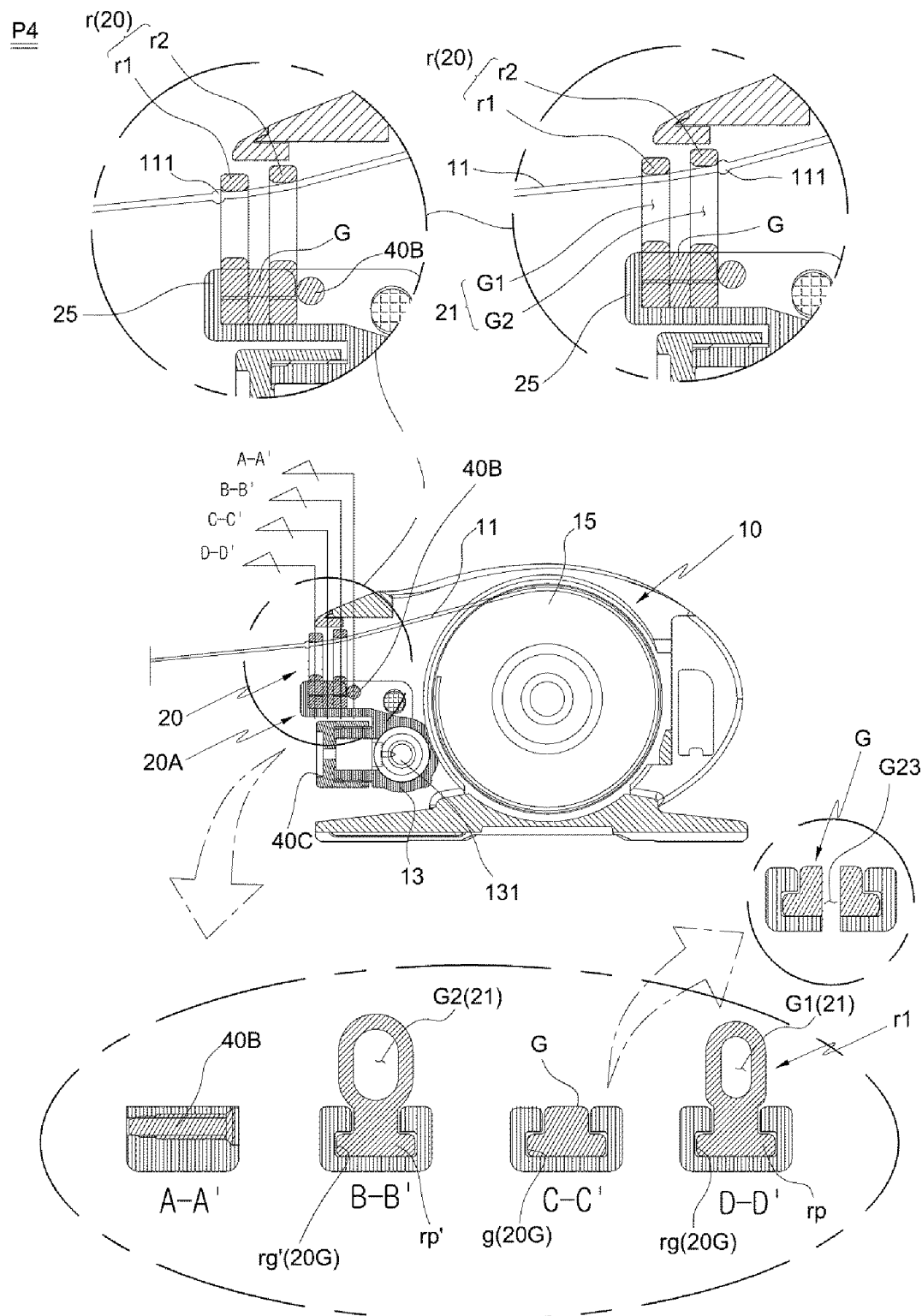
FIG. 5 is a cross-sectional view of a line guide assembly according to a fourth embodiment of the present invention.

Finally, FIG. 5 that shows a fourth embodiment also shows an assembly type line guide 20, in which a body 20A, a guide ring, and a reinforcing contact ring r are separably combined, and the reinforcing contact ring r that is a reinforcing member is composed of an outside-narrow first reinforcing contact ring r1 and an inside-wide second reinforcing contact ring r2 spaced from each other by a spacing member.

In the circle shown by a dashed dotted line at the upper left side in FIG. 5, the guide ring and the outside-narrow first reinforcing contact ring r1 of the reinforcing contact ring r that are in contact with the knot 111 when the fishing line 11 is wound are shown in an enlarged size.

In the circle shown by a dashed dotted line at the upper right side in FIG. 5, the guide ring and the inside-wide second reinforcing contact ring r2 of the reinforcing contact ring r that are in contact with the knot 111 when the fishing line 11 is released are shown in an enlarged size.

As can be seen from the enlarged view in an ellipse shown by a dashed dotted line at the lower portion and the enlarged views in the circles shown by dashed dotted lines at the upper left and right sides in FIG. 5 showing vertical cross-sectional views taken along lines A-A', B-B', C-C', and D-D', a mounting portion has a guide rail 20G inside a left anti-separation wall 25 and guide protrusions rg and rg' of insertion protrusions rp and rp' disposed to slide in the guide rail 20G that are coupling portions of the outside-narrow first reinforcing contact ring r1 and the inside-wide second reinforcing contact ring r2, respectively, to prevent separation (see the cross-sectional views taken along line D-D' and B-B'). Further, a guide protrusion g of a spacer G (see the cross-sectional view taken along line C-C') that is a spacer is disposed to slide in the guide rail 20G to prevent separation. Accordingly, the guide rail 30G and the guide protrusions rg, rg', and g have a coupling structure similar to a dove-tail type.

When the outside-narrow first reinforcing contact ring r1 is slid in the guide rail 20G that is a coupling portion of the body 20A, the insertion protrusion rp of the first reinforcing contact ring is in contact with the inner side of the left anti-separation wall 25.

Further, when the spacer G and the inside-narrow second reinforcing contact ring r2 are inserted in the guide rail 20G, they are prevented from separating upward by the guide protrusions rg, rg', and g, and left-side separation of the first and second reinforcing contact rings r1 and r2 and the spacer G is prevented by the anti-separation wall 25 of the body 20A.

Further, right-side separation of the first and second reinforcing contact rings r1 and r2 and the spacer G is prevented by a bolt 40B, which is a kind of fixer, disposed through the body 20A of the line guide 20 (see the cross-sectional view taken along line A-A').

The outer side of the bolt 40B is in contact with the insertion protrusion rp' of the second reinforcing contact ring r2, so an assembly structure that prevents shaking may be achieved.

Further, as can be seen from the modified example in the circle shown by a dashed dotted line at the right side at the center in FIG. 5, which is in relation with the cross-sectional view taken along line C-C' in the ellipse shown by a dashed dotted line at the lower portion of FIG. 5, a vertical (inclined) hole is formed in the spacer G and the guide rail 20G of the body 20A to function as drains G23.

These holes correspond to modified drains arranged 'under the guide 21' composed of an outside-narrow first guide portion G1 and an inside-wide second guide portion G2.

Although a line guide and a reel that have a specific shape and structure were described above with reference to the accompanying drawing, the present invention may be changed and modified in various ways by those skilled in the art and those changes and modifications should be construed as being included in the scope of the present invention.

What is claimed is:
1. A reel equipped with a line guide, comprising:
a reel body having a spool;
a level winder including a double threaded-shaft mounted, ahead of the spool, on the reel body;
a line guide having a body having a corresponding fastening portion coupled to the double threaded-shaft of the level winder;
a first reinforcing contact ring installed in the body, the first reinforcing contact ring including a first insertion protrusion integrally formed with the first reinforcing contact ring, the first insertion protrusion being inserted into a first groove-shaped mounting portion formed in the body; and
a second reinforcing contact ring installed in the body and spaced apart from the first reinforcing contact ring, the second reinforcing contact ring including a second insertion protrusion integrally formed with the second reinforcing contact ring, the second insertion protrusion being inserted into a second groove-shaped mounting portion formed in the body, a fishing line from the spool passing through and being guided by the first reinforcing contact ring and the second reinforcing contact ring,
wherein the second reinforcing contact ring has a diameter larger than that of the first reinforcing contact ring and installed closer to the spool than the first reinforcing contact ring, and
wherein the first reinforcing contact ring and the second reinforcing contact ring are made of a wear resistance material.

2. The reel of claim 1, further comprising a pin-type fixer for fixing the first insertion protrusion and the second insertion protrusion inserted into the first groove-shaped mounting portion and the second groove-shaped mounting portion, respectively, to the body.

3. The reel of claim 1, wherein the first groove-shaped mounting portion and the second groove-shaped mounting portion form an integral single groove-shaped mounting portion.

* * * * *